(12) United States Patent
Hsu (10) Patent No.: US 7,008,067 B2
(45) Date of Patent: Mar. 7, 2006

(54) ELECTRICALLY OPERABLE PIVOTING ACTUATOR FOR DOOR MIRROR OF MOTOR VEHICLE

(75) Inventor: Chih-Pang Hsu, Yung-Ho (TW)

(73) Assignee: Chaw Khong Technology co., Ltd., Taipei (TW)

( * ) Notice: Subject to any disclaimer, the term of this patent is extended or adjusted under 35 U.S.C. 154(b) by 33 days.

(21) Appl. No.: 10/876,659

(22) Filed: Jun. 28, 2004

(65) Prior Publication Data
US 2004/0264015 A1 Dec. 30, 2004

(30) Foreign Application Priority Data
Jun. 28, 2003 (TW) ............................... 92117761 A (51) Int. Cl.
*B60R 1/07* (2006.01)
*B60R 1/074* (2006.01)

(52) U.S. Cl. ...................... 359/841; 359/877; 248/466

(58) Field of Classification Search .............. 359/841, 359/872, 877; 248/466, 475.1, 476, 479; B60R 1/07, B60R 1/074, 1/076

See application file for complete search history.

(56) References Cited

U.S. PATENT DOCUMENTS

| 6,022,113 | A | * | 2/2000 | Stolpe et al. | 359/841 |
| 6,130,514 | A | | 10/2000 | Oesterholt et al. | 318/438 |
| 6,672,731 | B1 | * | 1/2004 | Schnell et al. | 359/877 |
| 6,793,358 | B1 | * | 9/2004 | Sakata | 359/872 |
| 6,874,896 | B1 | * | 4/2005 | Yoshida | 359/841 |
| 2002/0105740 | A1 | * | 8/2002 | Yamauchi | 359/841 |

FOREIGN PATENT DOCUMENTS

DE          40 23 375 A1 * 1/1992

* cited by examiner

*Primary Examiner*—John Juba, Jr.
(74) *Attorney, Agent, or Firm*—Troxell Law Office PLLC (57) ABSTRACT

An electrically operable pivoting actuator for a door mirror is disclosed. The pivoting actuator comprises a frame, an electromotor, and an annular coupling member secured onto a horizontally extended support of the door mirror, the coupling member comprising two diametrically opposite protuberances wherein one protuberance is adapted to engage with a stop on the frame for stopping a clockwise or counterclockwise rotation of the coupling member relative to the frame so as to define a predetermined angle α of the fold-in door mirror as an angle between an extreme position of the stop engaged with one protuberance and another extreme position of the stop engaged with the other protuberance. The invention can be produced in a large scale for reducing the manufacturing cost and is adapted to install in any of a variety of door mirrors of motor vehicles without further modifications.

7 Claims, 10 Drawing Sheets

ELECTRICALLY OPERABLE PIVOTING ACTUATOR FOR DOOR MIRROR OF MOTOR VEHICLE

BACKGROUND OF THE INVENTION

1. Field of the Invention

The present invention relates to door mirrors of a motor vehicle and more particularly to an electrically operable pivoting actuator for the door mirror of the motor vehicle.

2. Description of Related Art

Folding of the door mirror relative to a motor vehicle is necessary in many situations. A folding over of the door mirror relative to the body of the car is occurred when, for example, an obstacle hits the door mirror from a rear position in which an angle from the fold-over position of the door mirror to the normal, operational position is defined as angle $\beta$. Further, a folding in of the door mirror relative to the body of the car is occurred when, for example, parking in a narrow space in which an angle from the normal, operational position to the fold-in position of the door mirror is defined as angle $\alpha$.

Designs about angle $\alpha$ and angles $\beta$ are well known. For instance, U.S. Pat. No. 6,130,514 disclosed an electrically operable pivoting actuator comprising a mirror base 11, a frame 12 fitted with the mirror base 11, a coupling gear wheel 26 sleeved on a base shaft 101 of the mirror base 11, a coupling member 30 on top of the coupling gear wheel 26, noses 32 and recessed portions 28 for providing a couple-limited claw coupling between the coupling member 30 and the coupling gear wheel 26, projections 31, fingers 103, and key ways 104 for providing a rotational securing and axial freedom of the coupling member 30 relative to the shaft 101, a helical spring 40 for exerting an axially downward directed pressure on the coupling member 30, an electromotor 20, a transmission system 21 coupled between the driven shaft 20' of the electromotor 20 and the coupling gear wheel 26, stop means including an annular top face 150, an inner ring 151, an outer ring 152, a first ring segment-shaped groove 153, inclined end faces 154 and 155, a second ring segment-shaped groove 156, inclined end faces 157 and 158, a first nose 159, inclined side faces 160 and 161, a second nose 162, inclined side faces 163 and 164, an annular top face 250, an inner ring 251, an outer ring 252, a third ring segment-shaped groove 253, inclined end faces 254 and 255, a fourth ring segment-shaped groove 256, inclined end faces 257 and 258, a third nose 259, inclined side faces 260 and 261, a fourth nose 262, and inclined side faces 263 and 264, and other associated means.

Components of the mirror base 11 and the frame 12 are caught when the extreme fold-out or fold-in position of the door mirror is reached. At this moment, the noses 32 fitted in the recessed portions 28 for enabling the coupling member 30 to move axially until contacting the detection means 300 thereunder. As a result, the detection means 300 is activated to stop the electromotor 20 for preventing further actions of the components from occurring as a safety means.

The desired angle $\alpha$ and angle $\beta$ can be achieved by the patent mainly by the provision of ring segment-shaped grooves, noses, etc. However, it is known that there are a variety of shapes about the body of the car. As such, angle $\alpha$ and particularly angle $\beta$ of one car can be different from that of the other car. Hence, it is often that ring segment-shaped grooves and noses are unique to one specific model of the car. In other words, mass production of a door mirror having the above electrically operable pivoting actuator is made impossible. As a result, the manufacturing cost is relatively high. Hence, a need for improvement exists.

SUMMARY OF THE INVENTION

It is an object of the present invention to provide an electrically operable pivoting actuator for the door mirror of a motor vehicle. The pivoting actuator can be produced in a large scale so that the manufacturing cost is relatively low.

It is another object of the present invention to provide an electrically operable pivoting actuator adapted to install in any of a variety of door mirrors of the motor vehicles without further modifications.

To achieve the above objects and features, the electrically operable pivoting actuator for a door mirror of a motor vehicle of the present invention comprising:

a frame comprising a channel at an annular frame part, an annular top groove around the channel, a transmission system spaced from the top groove, two idler gears meshed with the transmission system, a coupling gear wheel inside the top groove meshed with the idler gears, the coupling gear wheel including a central hole, an annular flange extended downward from an underside of the frame, two diametrically opposite slots on the flange, and resilient means rested on the coupling gear wheel, an annular lower groove around the channel in the underside of the frame, and a raised stop in the underside of the frame;

a cover together with the top groove and the transmission system to form a housing;

an electromotor in the cover, the electromotor having a driven worm extended into the frame to be meshed with the transmission system;

an annular coupling member secured onto a horizontally extended support of the door mirror, the coupling member comprising two diametrically opposite protuberances wherein one protuberance is adapted to engage with the stop of the frame for stopping a clockwise or counterclockwise rotation of the coupling member relative to the frame so as to define a predetermined angle $\alpha$ of the fold-in door mirror as an angle between an extreme position of the stop engaged with one protuberance and another extreme position of the stop engaged with the other protuberance; and a shaft member inserted the coupling gear wheel, the shaft member comprising an annular base having a larger diameter, the base being fitted in the coupling member, and two diametrically opposite protrusions on the base, the protrusions being fitted in the slots of the coupling gear wheel.

Preferrably, the lower groove of the pivoting actuator of the present invention further comprises an inner ring segment-shaped groove and an outer ring segment-shaped grooves so that a predetermined angle $\beta$ of the fold-out door mirror is defined as an angle between two extreme positions of the inner ring segment-shaped groove and the outer ring segment-shaped groove, the pivoting actuator further comprising an abutment ring under the frame, the abutment ring being fitted in the lower groove, the abutment ring being secured onto the coupling member, the abutment ring comprising a central hole with the flange fastened therein, three arc recesses equally spaced around an underside wall of the central hole of the abutment ring, two diametrically opposite inner and outer arc projections on top, the inner and outer arc projections being fitted in the inner ring segment-shaped groove and the outer ring segment-shaped groove of the lower groove respectively, and three arcuate projections on the base, the arcuate projections being alternate relative to the protrusions and being fitted in the arc recesses of the abutment ring .

The above and other objects, features and advantages of the present invention will become apparent from the following detailed description taken with the accompanying drawings.

DETAILED DESCRIPTION OF THE PREFERRED EMBODIMENTS

Referring to FIGS. 1 to 9, there is shown an electrically operable pivoting mechanism for the door mirror of a motor vehicle in accordance with the invention. Each component of the invention will be described in detail below.

A frame 10 having an annular frame part and a rectangular frame part, comprises a channel 11 (see FIG. 3) at the annular frame part, an annular top groove 12 around a top portion of the channel 11, a top cavity 13 in the rectangular frame part and at a side of the top groove 12 and in communication with the top groove 12, two vertical recesses 130 at both sides of the top cavity 13, two rectangular supporting plates 14 having a central aperture 140 fitted in the recesses 130, a worm 15 pivotably supported between the supporting plates 14 by inserting in the apertures 140, a worm wheel 16 formed around the worm 15, two posts 131 in the top cavity 13 near the recesses 130—130 and between the top groove 12 and the worm 15, two idler gears 17 pivotably sleeved on the posts 131, the idler gears 17 being meshed with the worm 15, a friction ring 120 optionally with the interposition inside the top groove 12, an coupling gear wheel 18 provided in the top groove 12 and meshed with the idler gears 17, the coupling gear wheel 18 including an annular flange 181 extended downward from the underside thereof, two opposite slots 182 on the flange 181, an annular top face 183, and a helical spring 184 rested on the top face 183, and a positioning ring 51A having a plurality of flexible teeth around its center to form a latch section 510.

Figure 3:
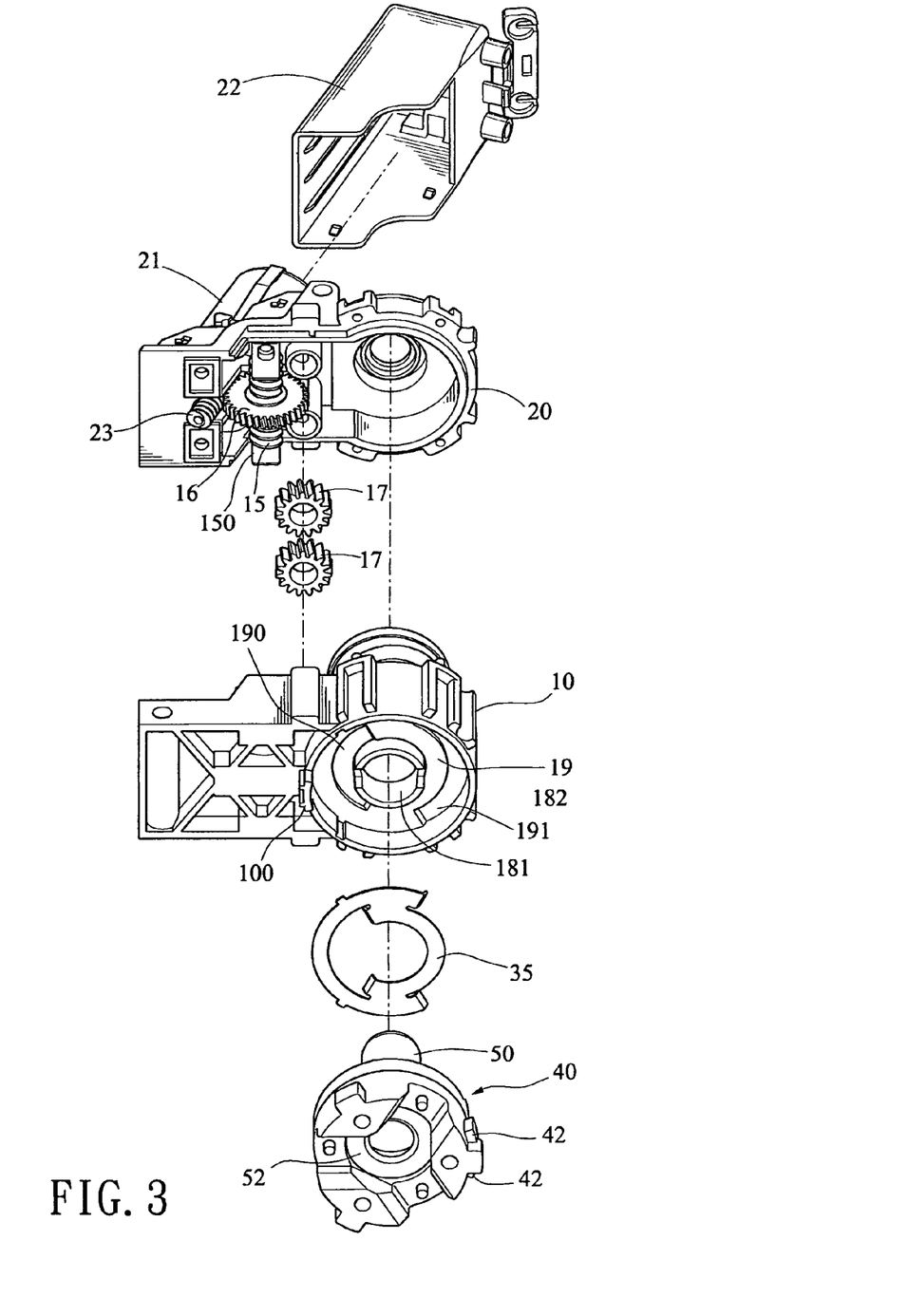
FIG. 3 is a bottom exploded perspective view of the partially assembled components shown in FIG. 2.
Figure 7A:
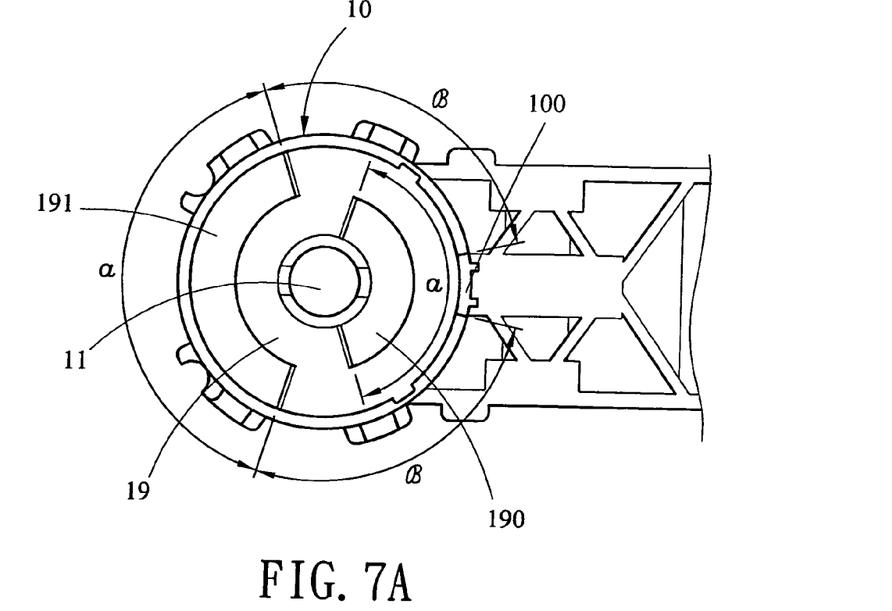
FIG. 7A is a bottom plan view illustrating angle α and angle β of the pivoting mechanism.
Figure 7B:
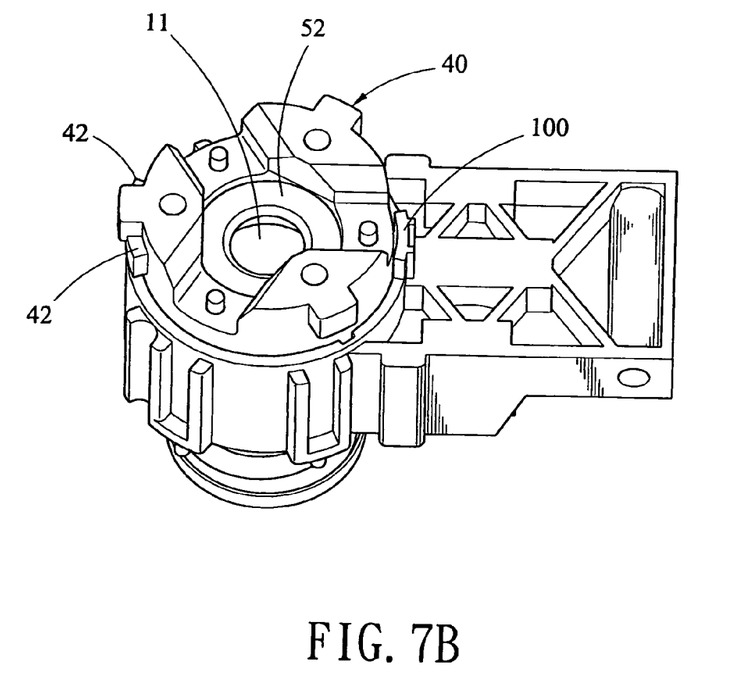
FIG. 7B is a perspective view of the pivoting mechanism viewed from the bottom.

Referring to FIGS. 3 and 7A specifically, the frame 10 further comprises an annular lower groove 19 around a bottom portion of the channel 11, the lower groove 19 having an inner ring segment-shaped groove 190 of recessed design and an outer ring segment-shaped groove 191 of recessed design in which a predetermined angle α of the fold-out door mirror 60 is defined as an angle between two extreme positions of the inner ring segment-shaped groove 190 and the outer ring segment-shaped groove 191. Also, a raised stop 100 (see FIG. 3) is formed in the underside of the frame part of the frame 10.

Figure 4:
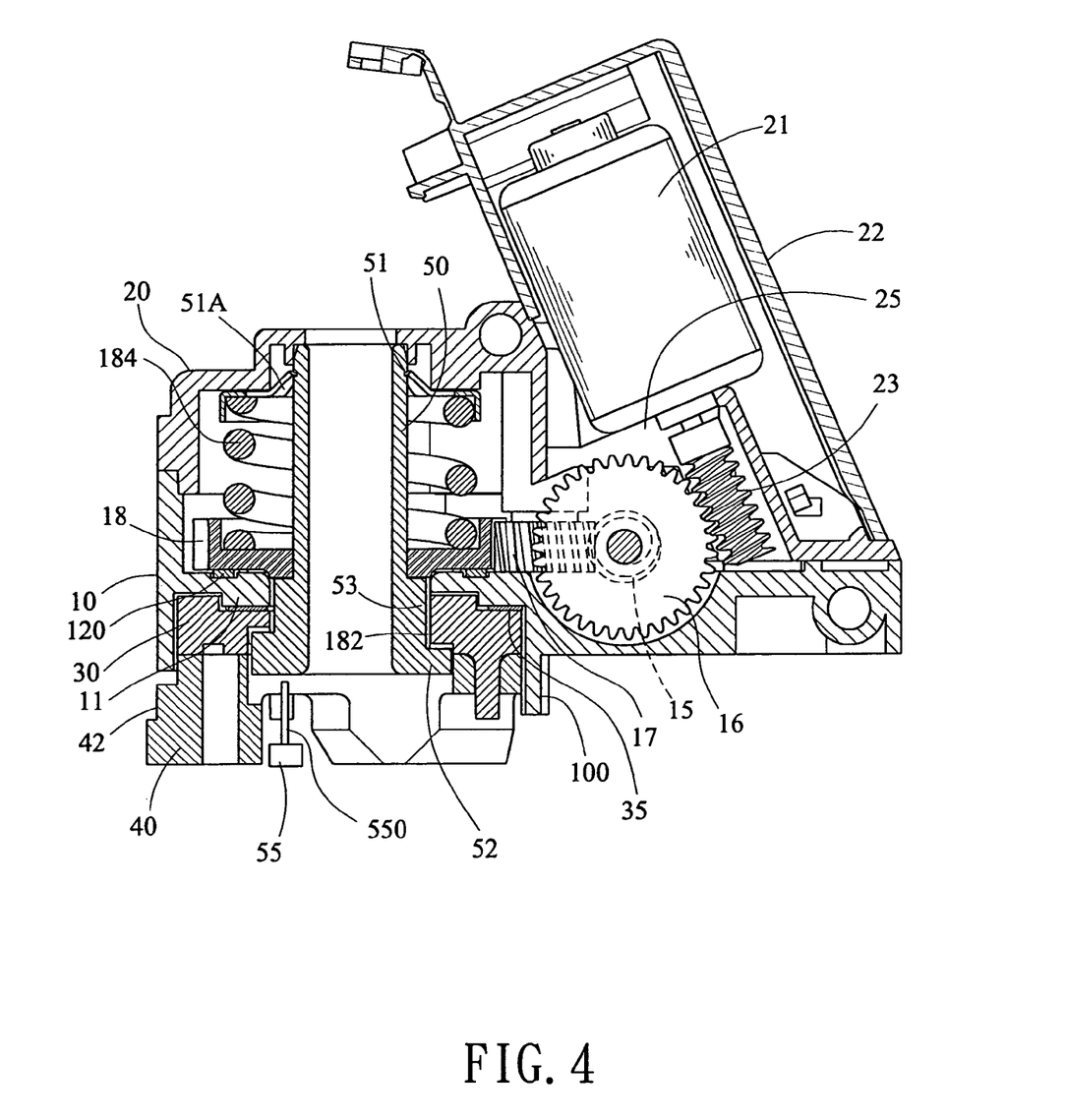
FIG. 4 is a cross-sectional view of FIG. 1, where the pivoting mechanism is deactivated.
Figure 5:
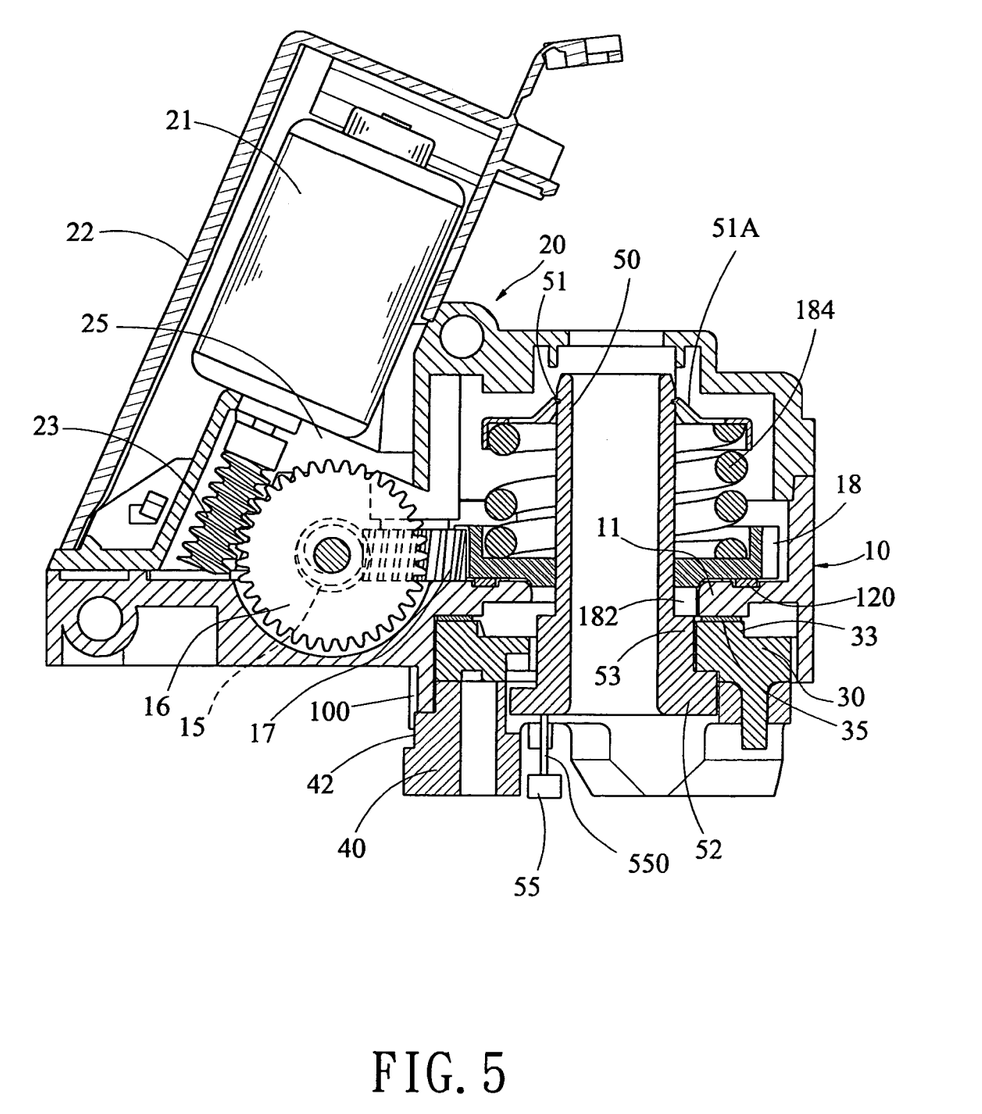
FIG. 5 is a view similar to FIG. 4, where the pivoting mechanism is activated.

A cover 20 is shaped to conform to the top groove 12 and the top cavity 13 of the frame 10 so as to matingly couple to the frame 10 for forming a housing. An electromotor 21 is provided in the cover 20. The electromotor 21 is above the top cavity 13. The electromotor 21 is enclosed by a shroud 22. A driven worm 23 is extended from the electromotor 21 into the top cavity 13 to be meshed with the worm wheel 16, as shown in FIGS. 4 and 5.

Figure 1:
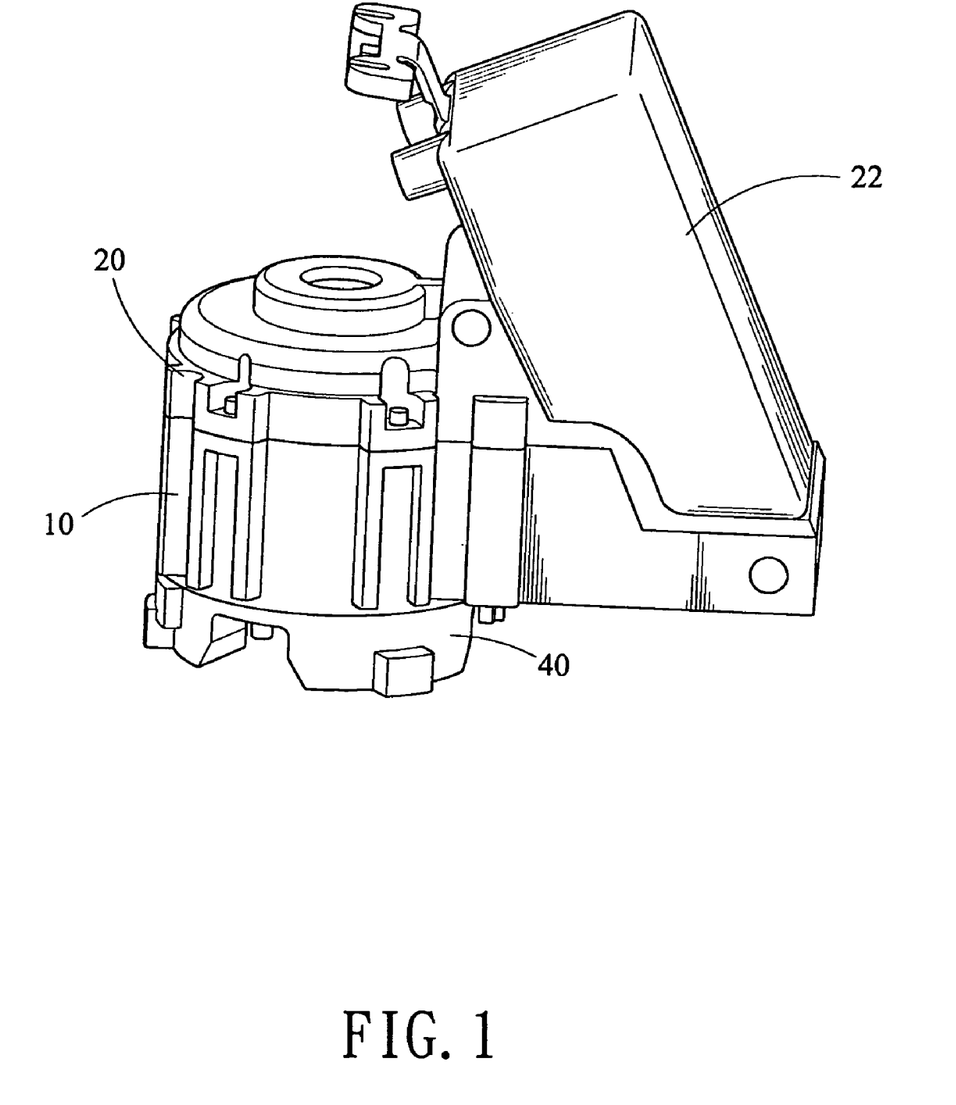
FIG. 1 is a perspective view of a preferred embodiment of electrically operable pivoting mechanism for the door mirror of a motor vehicle according to the invention.
Figure 2:
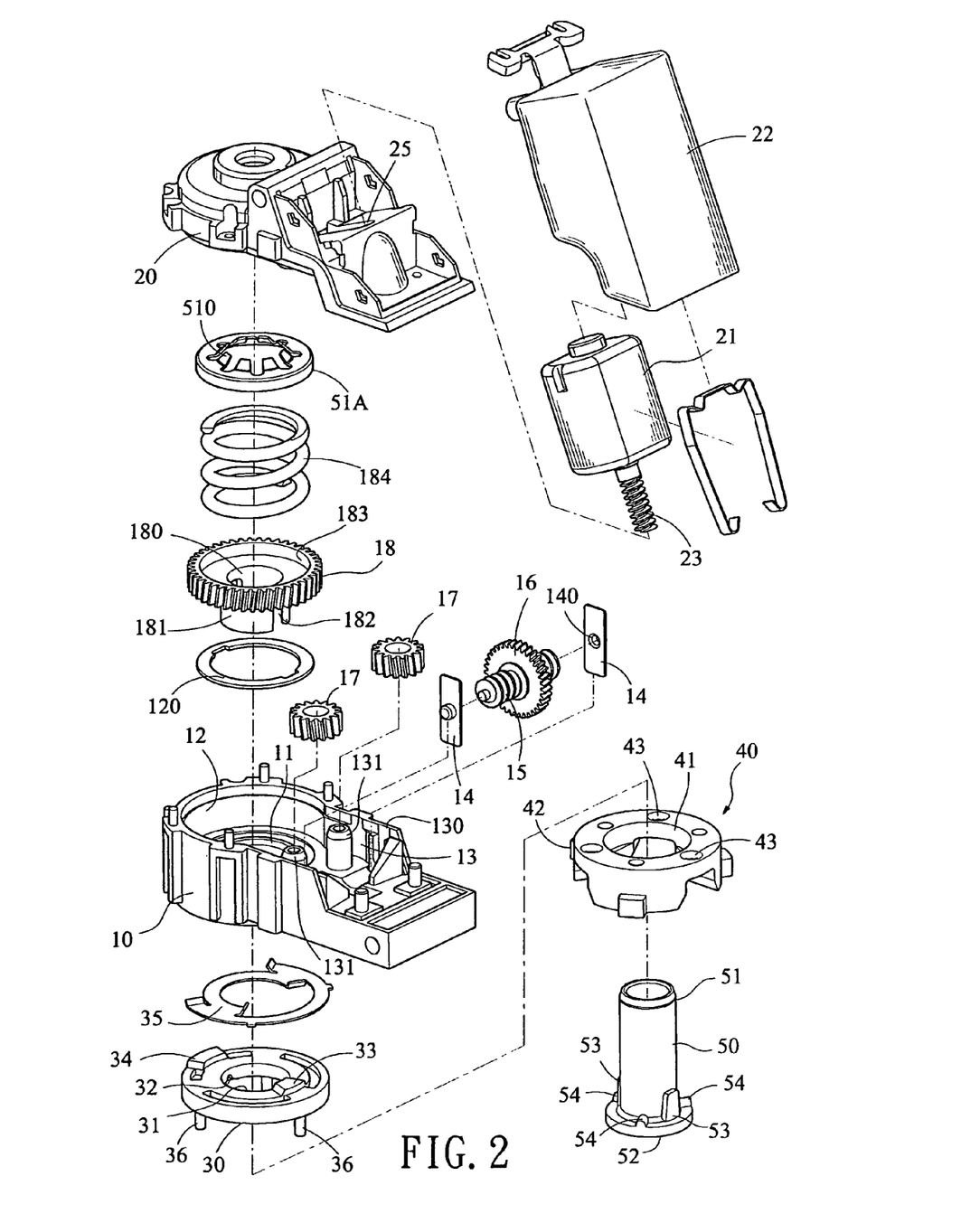
FIG. 2 is an exploded perspective view of FIG. 1.

An abutment ring 30 as shown in FIG. 2 is formed under the frame 10 and is fitted in the lower groove 19. The abutment ring 30 comprises a central hole 31, three arc recesses 32 equally spaced around the underside wall of the central hole 31, a plurality of legs 36 on the lower portion thereof, and two diametrically opposite inner and outer arc projections 33 and 34 on top, the inner and outer arc projections 33 and 34 being fitted in the inner ring segment-shaped groove 190 and the outer ring segment-shaped groove 191 respectively, and a second friction ring 35 being optionally with the interposition on top of the abutment ring 30.

Figure 9:
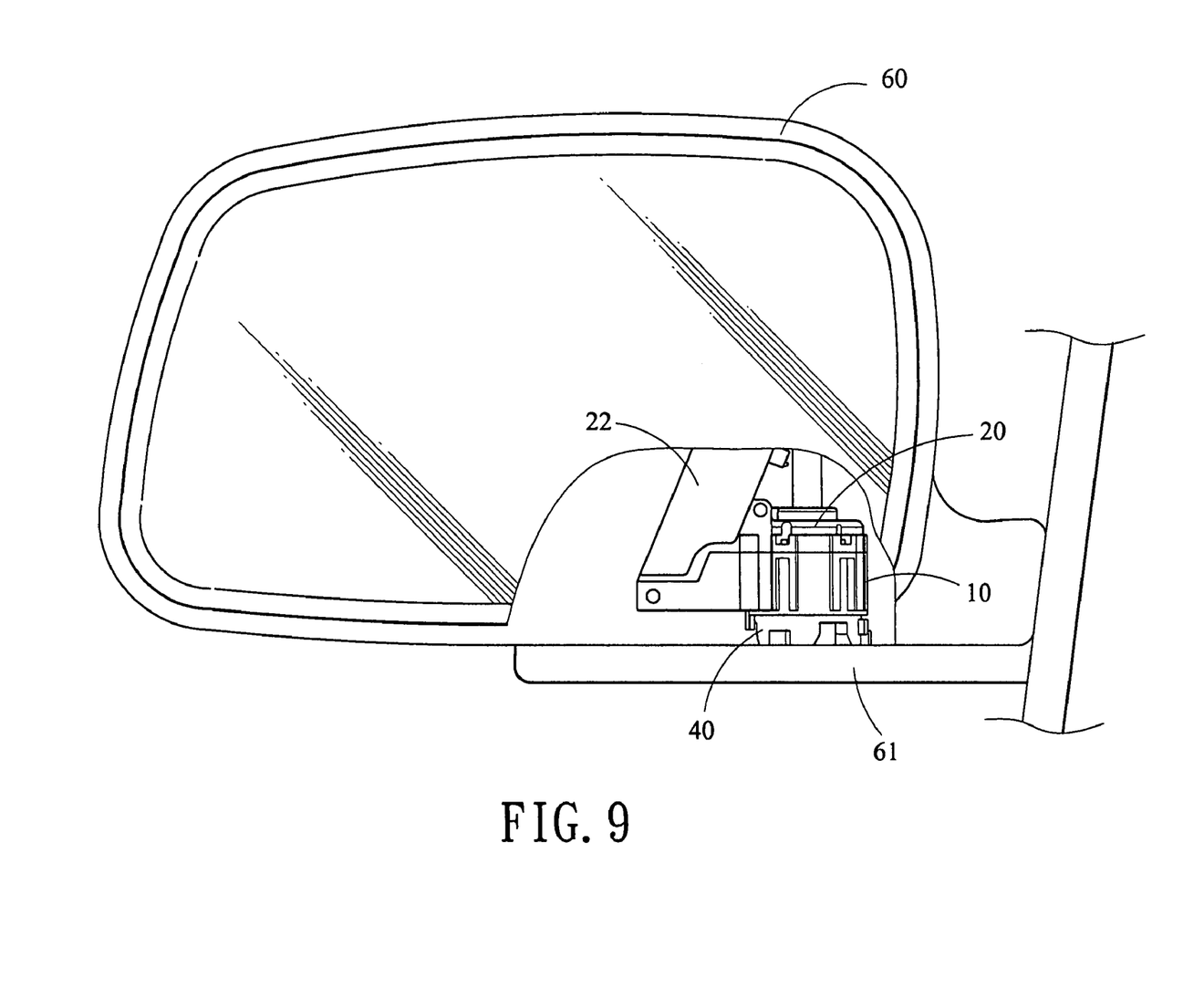
FIG. 9 schematically shows a rear plan view of the door mirror in an operational position.

An annular coupling member 40 having a central hole 41, a plurality of holes 43 equally spaced apart on top for snuggly receiving a plurality of legs 36 on the underside of the abutment ring 30 for fastening. The coupling member 40 is again secured to top of a horizontally extended support 61 of the door mirror 60 as shown in FIG. 9. The support 61 is attached to the car. For the purpose of protecting the car body from damage when the fold-over movement is carried out, the coupling member 40 comprises two opposite protuberances 42 therearound as shown in FIGS. 3, 4, 5, 6A, 6B and 7B. One of the protuberances 42 is adapted to engage with the stop 100 of the frame 10 for stopping the clockwise or counterclockwise rotation of the coupling member 40 relative to the frame 10 in which a predetermined angle β of the fold-over door mirror 60 is defined as an angle between an extreme position (fold-out movement of door mirror 60) of the stop 100 engaged with one protuberance 42 for one side of the door mirror 60 and another extreme position of the stop 100 engaged with the other protuberance 42 for other side of the door mirror 60.

A shaft member 50 is inserted through a central hole 180 of the coupling gear wheel 18 and disposed between the abutment ring 30 and the annular coupling member 40. The shaft member 50 comprises an annular recess 51 adjacent its top. The recess 51 is fastened by the latch section 510. The shaft member 50 further comprises an annular base 52 having a larger diameter, the base 52 being fitted in a central hole 41 of the coupling member 40, two diametrically opposite protrusions 53 on the base 52, the protrusions 53 being fitted in the slots 182 of the coupling gear wheel 18, and three arcuate projections 54 on the base 52, the projections 54 being alternate relative to the protrusions 53 and being fitted in the recesses 32 of the abutment ring 30.

Description of assembling the invention will be described in detail below. As shown in FIGS. 3 and 4, insert the shaft member 50 through the hole 31 and have legs 36 of the abutment ring 30 inserted into the hole 43 of the coupling member 40 for snuggly fastening together, and also let the base 52 of the shaft member 50 receive in the central hole 41 of the coupling member 40, the shaft member 50 further insert through the friction rings 35 and 120, the hole 180, and the helical spring 184 until the recess portion 51 passes the latch section 510, the flange 181 fits in the hole 31, and the protrusions 53 fits in the slots 182. This enables the coupling gear wheel 18 to be pivotal. Also, the coupling gear wheel 18 is meshed with the idler gears 17. Next, install the cover 20, the electromotor 21, and the driven worm 23 on the frame 10 with the driven worm 23 being meshed with the worm wheel 16. This forms a door mirror having an electrically operable pivoting mechanism.

Referring to FIGS. 4 to 9 specifically, portions of the cover 20 and the frame 10 are fixedly coupled to the door mirror 60. Also, the coupling member 40 is secured to top of the support 61 of the door mirror 60. For folding in the door mirror 60, a driver can press a button to turn on the electromotor 21. Power of the electromotor 21 is transmitted to the shaft member 50 and the frame 10 for pivoting the same via the transmission of the driven worm 23, the worm wheel 16, the worm 15, the idler gears 17, and the coupling gear wheel 18. Also, the inner and outer arc projections 33 and 34 pivot relative to the inner ring segment-shaped groove 190 and the outer ring segment-shaped groove 191 respectively. As an end, the frame 10 is able to rotate and to carry out fold-in (or fold-out) movement for the door mirror 60 rearwardly relative to a pivot axis to move closer to the body of the car. It is noted that the end stops of the grooves 190, 191 will contact the one of the arc projections 33 and 34 respectively, when the frame 10 has pivoted to the predetermined angle α during the rotational movement of the frame 10. Once contacted, the frame 10 and thus the door mirror 60 are prevented from further rotating. This finishes the folding-in (or folding-out) operation of the door mirror 60 (see FIG. 8A).

Figure 6A:
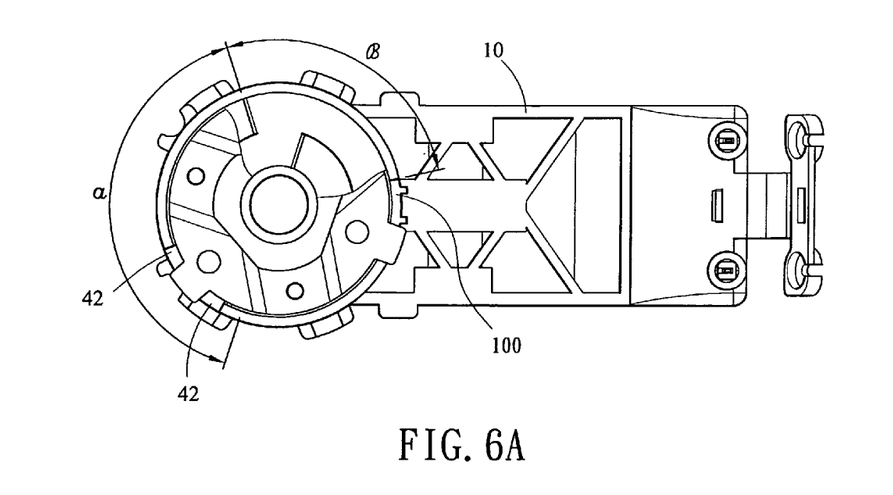
FIG. 6A is a bottom plan view of the pivoting mechanism.
Figure 6B:
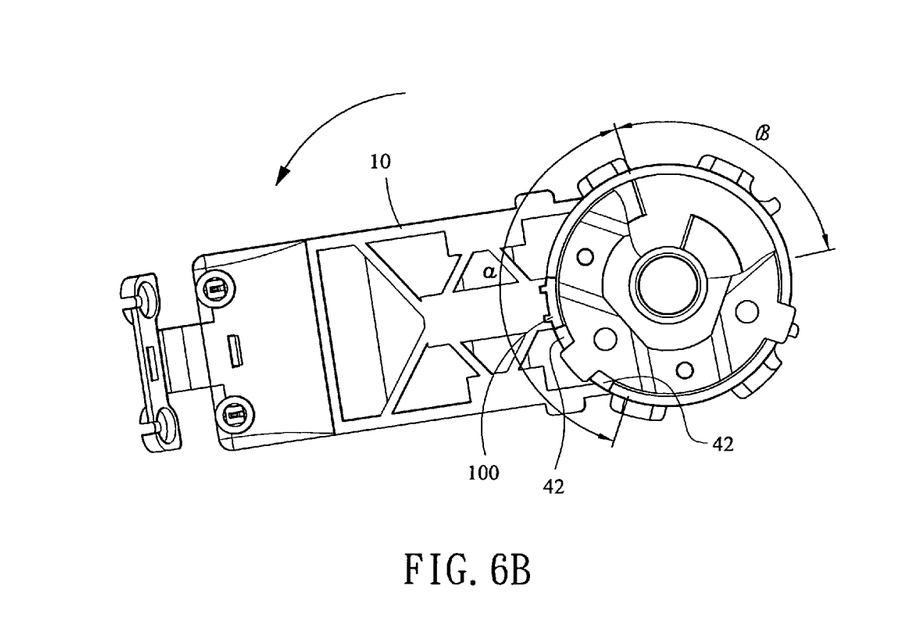
FIG. 6B is a view similar to FIG. 6A, where the door mirror is in a folded position.

Note that the provision of the stop 100 of the frame 10 further cooperating protuberances 42 and the predetermined flod-over angle β thus defined (i.e., from the angle of the stop 100 contacting one protuberance 42 to the angle of the stop 100 contacting the other protuberance 42) aims at adapting the invention to any of a variety of models of cars. In detail, a simple position modification of the protuberances 42 relative to the stop 100 of the frame 10 is sufficient to change the predetermined angle β, as shown in FIGS. 6A, 6B and 7A. Modifications of other components are not necessary. As to the adjustment of the predetermined angle β, a simple adjustment of the protuberances 42 is also sufficient. Hence, door mirrors incorporating the pivoting mechanisms can be produced in a large scale so that the manufacturing cost is relatively low.

Referring to FIGS. 3 to 5 specifically, for preventing the electromotor 21 from continuing to rotate after the desired fold in position has reached, there are provided three arc recesses 32 equally spaced around the inner wall of the central hole 31. Also, three arcuate projections 54 are formed on the base 52. Further, the projections 54 are fitted in the recesses 32. Furthermore, a detector 55 is formed under the base 52. The detector 55 has an operating rod 550 under the base 52. The detector 55 is electrically coupled to the electromotor 21. Further, the end stops of the grooves 190, 191 will contact the one of the arc projections 33, 34 respectively, when the frame 10 has pivoted to the predetermined angles β during the carrying out fold-out movement of the frame 10. Once contacted, the frame 10 and thus the door mirror 60 are prevented from further rotating. At this moment, the electromotor 21 still rotates to output power to the shaft member 50 without load. Also, the shaft member 50 and the abutment ring 30 are fastened together due to the engagement of the arcuate projections 54 and the arc recesses 32. Hence, the projections 54 will clear from the recesses 32 once the electromotor 21 is in a no load operating state. Next, the shaft member 50 overcomes the elastic force of the helical spring 184 to force the shaft member 50 to move down (see FIGS. 4 and 5) until the base 52 contacts the operating rod 550 of the detector 55 (see FIG. 5). The detector 55 is thus enabled to switch off the electromotor 21. This is a machine protection mechanism.

Figure 8A:
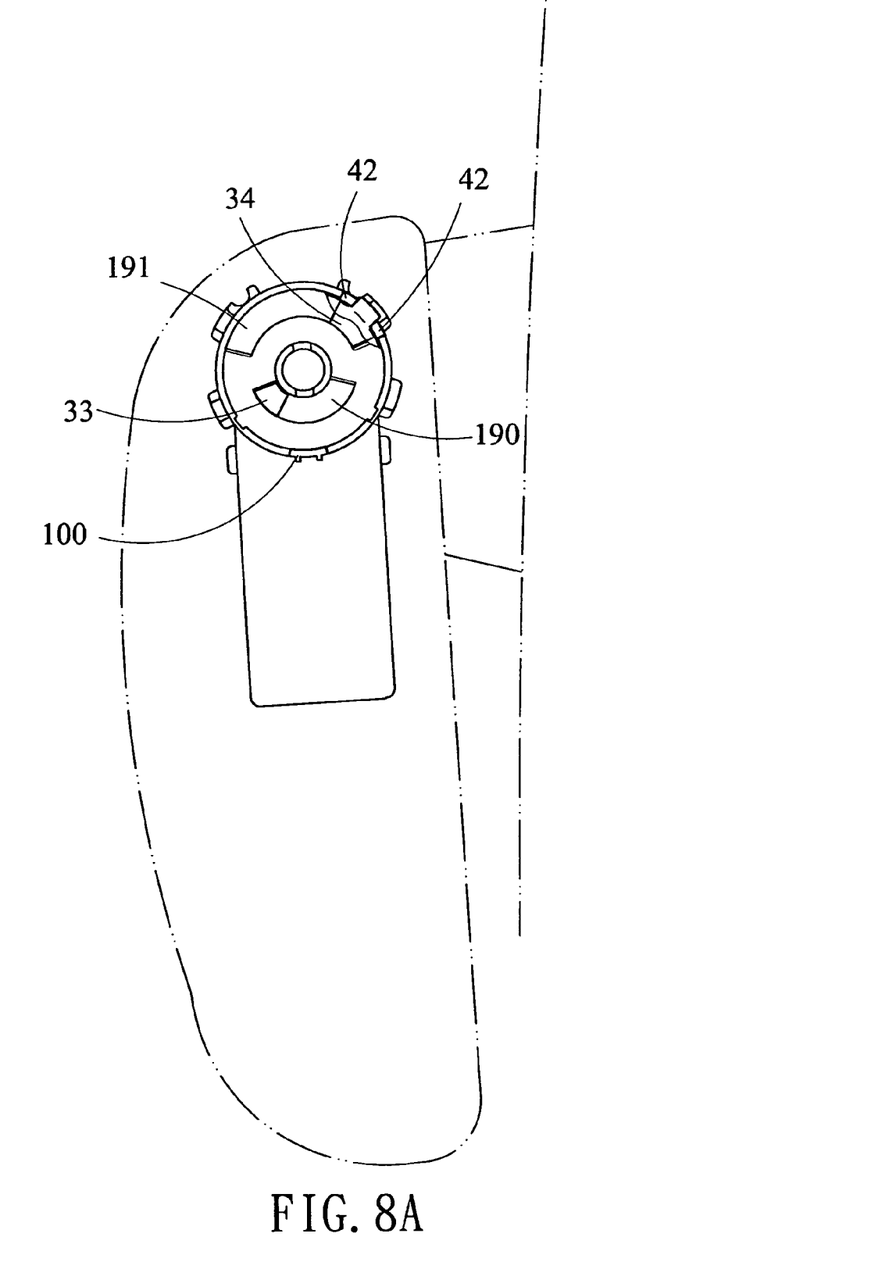
FIG. 8A schematically shows a top plan view of the door mirror in a fold-in position for illustrating angle α.
Figure 8B:
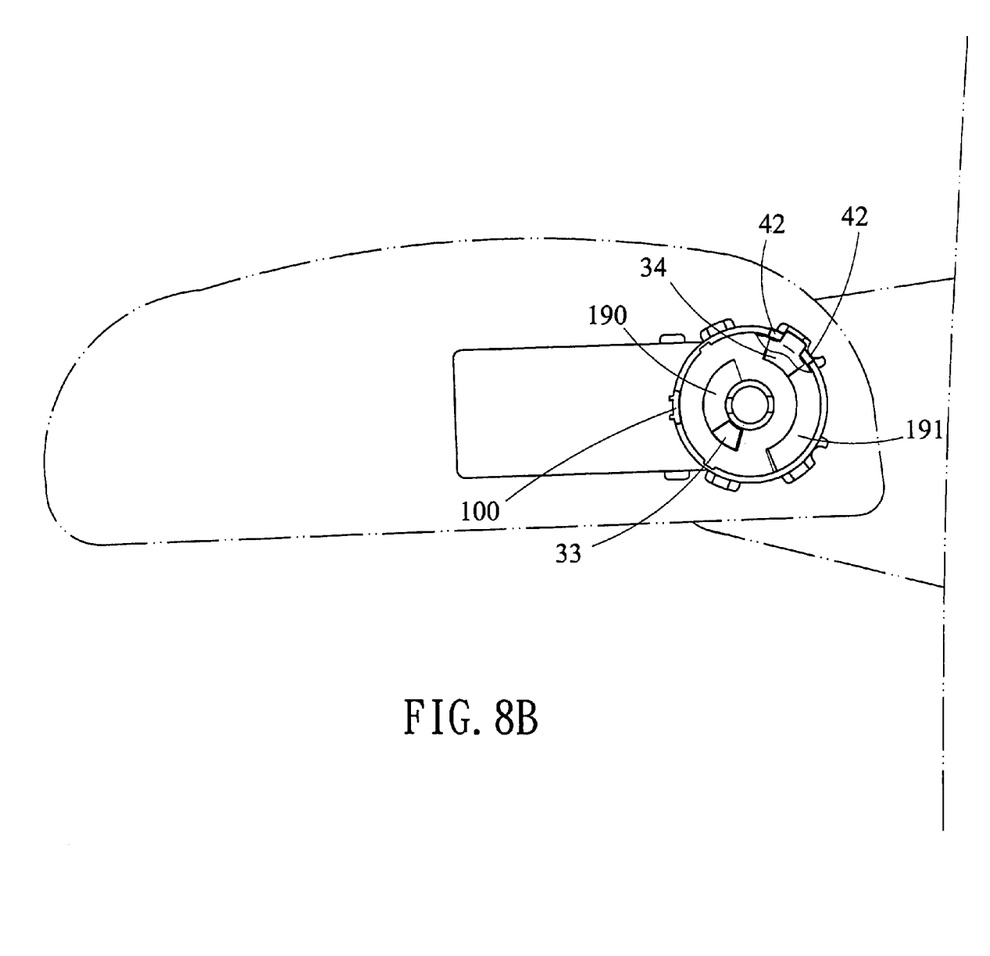
FIG. 8B schematically shows a top plan view of the door mirror in a fold-over position for illustrating angle β.

Referring to FIGS. 7A and 8B specifically, the inner ring segment-shaped groove 190 and the outer ring segment-shaped groove 191 have the same shape for cooperating with the predetermined angle α of the door mirror 60. For example, an external force (such as a pedestrian walking past) accidentally hits the door mirror 60 from rear. The inner ring segment-shaped groove 190 and the outer ring segment-shaped groove 191 will pivot outwardly or even until the predetermined angles β is reached (see FIGS. 6A, 6B and 8B).

It will be evident from the foregoing that the invention is highly adaptable. Further, the invention can carry out a mass production of the door mirrors 60 and thus reduce the manufacturing cost by suitably designing the stop 100 and the protuberances 42 for controlling the predetermined angle α of the door mirror 60 without modifying most components.

While the invention herein disclosed has been described by means of specific embodiments, numerous modifications and variations could be made thereto by those skilled in the art without departing from the scope and spirit of the invention set forth in the claims.

What is claimed is:

1. An electrically operable pivoting actuator for a fold-in door mirror of a motor vehicle, comprising:

a frame (10) having an annular frame part and a rectangular frame part integrally formed with the annular frame part, the frame (10) comprising a channel (11) at a center of the annular frame part, an annular top groove (12) around a top portion of the channel (11), an annular lower groove (19) around a bottom portion of the channel (11) in the underside of the annular frame part, and a raised stop (100) in the underside of the annular frame part of the frame (10);

a coupling gear wheel (18) disposed inside the top groove (12), the coupling gear wheel (18) including a central hole (180), an annular flange (181) extended downward from an underside thereof, two diametrically opposite slots (182) on the flange (181), and an annular top face (183);

a resilient means (184) rested and exerting an axially downward pressure force on annular top face (183) of the coupling gear wheel (18);

a cover (20) together with the a frame (10) to form a housing;

an electromotor (21) in the cover (20), the electromotor (21) having a driven worm (23) extended into the housing of the frame (10);

a transmission system (15, 16, 17) disposed in the rectangular frame part of the frame (10) coupled between the driven worm (23) of the electromotor (21) and the coupling gearwheel (18);

an annular coupling member (40) secured onto a horizontally extended support (61) of the fold-in door mirror (60), the coupling member (40) comprising a central hole (41), a plurality of holes (43) equally spaced apart on top thereof, and two diametrically opposite protuberances (42) wherein one protuberance (42) is adapted to engage with the stop (100) of the frame (10) for stopping a clockwise or counterclockwise rotation of the coupling member relative to the frame (10) so as to define a predetermined angle a of the fold-in door mirror as an angle between an extreme position of the stop engaged with one protuberance (42) and another extreme position of the stop (100) engaged with the other protuberance (42);

an abutment ring (30) disposed between the annular coupling member (40) and the frame (10), and fitted in the lower groove (19) of the frame (10), the abutment ring (30) being secured onto the coupling member (40), the abutment ring (30) comprising a central hole (31) with the annular flange (181) of the coupling gear wheel (18) fastened therein, three arc recesses (32) equally spaced around an underside wall of the central hole (31) of the abutment ring (30), a plurality of legs (36) on the underside thereof for snuggly inserting into the plurality of holes (43) of the annular coupling member (40), respectively for releaseably fastening the abutment ring (30) and the coupling member (40) together, and two diametrically opposite inner and outer arc projections (33, 34) on top thereof, the inner and outer arc projections (33, 34) being fitted in an inner ring segment-shaped groove (190) and an outer ring segment-shaped groove (191) of the lower groove (19) respectively; and a shaft member (50) inserted into the flange (181) of the coupling gear wheel (18), the shaft member comprising an annular base (52) having a larger diameter, the base being fitted in the central hole (41) of the coupling member (40), and two diametrically opposite protrusions (53) on the base, the protrusions (53) being fitted in the slots (182) of the coupling gear wheel (18), and three arcuate projections (54) on the base of the shaft member (50), the arcuate projections (54) being alternate relative to the protrusions (53) and being fitted in the arc recesses (32) of the abutment ring (30) for releaseable engagement therebetween.

2. The pivoting actuator of claim 1, wherein the lower groove (19) includes an inner ring segment-shaped groove (190) and an outer ring segment-shaped grooves (191) so that a predetermined angle β of the fold-out door mirror is defined as an angle between two extreme positions of the inner ring segment-shaped groove (190) and the outer ring segment-shaped groove (191).

3. The pivoting actuator of claim 2, further comprising a first friction ring (35) sandwiched between the abutment ring (30) and the lower groove (19).

4. The pivoting actuator of claim 1, wherein the transmission system comprises a worm (15) pivotably supported between supporting plates and a worm wheel (16) formed around a central part of the worm (15), the worm wheel (16) being meshed with idler gears (17), and the frame further comprises a top cavity (13) adjacent the top groove (12) with the transmission system fitted in the top cavity (13), the top cavity (13) including two vertical recesses (130) at both sides and two rectangular, holed plates (14) fitted in the vertical recesses (130), and two posts (131) in the top cavity (13) between the top groove (12) and the worm (15), the posts (131) being inserted through the idler gears (17) to be pivotably coupled together.

5. The pivoting actuator of claim 4, wherein the driven worm (23) is extended into the top cavity (13) to be meshed with the worm wheel (16).

6. The pivoting actuator of claim 1, further comprising a positioning ring (51A) having a central latch section (510), and wherein the shaft member (50) further comprises an annular recess portion (51) adjacent its top, the recess portion (51) being fastened by the latch section (510).

7. The pivoting actuator of claim 1, further comprising a second friction ring (120) sandwiched between the top groove (12) and the coupling gear wheel (18).

* * * * *